United States Patent [19]

Perilstein

[11] 4,227,889
[45] Oct. 14, 1980

[54] COMPRESSION IGNITION FUELS FOR USE IN DIESEL ENGINE HAVING ANTI-WEAR PROPERTIES

[75] Inventor: Warren L. Perilstein, Orchard Lake, Mich.

[73] Assignee: Ethyl Corporation, Richmond, Va.

[21] Appl. No.: 973,003

[22] Filed: Dec. 26, 1978

[51] Int. Cl.$^2$ ............................................... C10L 1/22
[52] U.S. Cl. .......................................... 44/56; 44/57; 44/66
[58] Field of Search ............................... 44/66, 56, 57

[56] References Cited

U.S. PATENT DOCUMENTS

| | | | |
|---|---|---|---|
| 2,404,094 | 7/1940 | Robertson | 44/56 |
| 2,631,979 | 3/1953 | McDermott | 252/57 |
| 2,632,695 | 3/1953 | Landis et al. | 44/66 |
| 2,822,330 | 2/1958 | Riggs, Jr. et al. | 252/8.55 |
| 3,001,857 | 7/1961 | Pollock | 44/57 |
| 3,017,354 | 1/1962 | Riggs, Jr. | 252/8.55 |
| 3,696,048 | 10/1972 | Hausler et al. | 252/392 |
| 4,002,437 | 1/1977 | Broeckx et al. | 44/66 |

OTHER PUBLICATIONS

English Translation of Brazilian Patent Application, No. PI7700392, which was applied for on 1/21/77.

*Primary Examiner*—Winston A. Douglas
*Assistant Examiner*—Y. Harris-Smith
*Attorney, Agent, or Firm*—Donald L. Johnson; Robert A. Linn; Willard G. Montgomery

[57] ABSTRACT

An anti-wear compression ignition fuel composition for use in diesel engines comprising (1) from about 70 percent by weight to about 98.45 percent by weight of a monohydroxy alkanol having from 1–5 carbon atoms, (2) from about 1 percent by weight to about 25 percent by weight of a fuel oil boiling above the gasoline boiling range, and (3) a wear inhibiting amount of a dimerized unsaturated fatty acid. Optionally, said fuel composition may also contain an ignition accelerator such as an organic nitrate.

27 Claims, No Drawings

COMPRESSION IGNITION FUELS FOR USE IN DIESEL ENGINE HAVING ANTI-WEAR PROPERTIES

BACKGROUND OF THE INVENTION

The problem of engine wear in diesel engines operating on hydrocarbon fuels has become increasingly serious with the recent shift to the use of both lighter and cleaner burning diesel fuel oils, and with the use of alcohols, such as methanol and ethanol, in the place of conventionally petroleum derived diesel fuels as disclosed in Brazilian Patent Application No. P17700392. Of particular concern are wear problems associated with the fuel injector mechanisms used in such engines. This problem is also of concern in fuel compositions comprising mixtures of alcohols and petroleum derived diesel fuels such as those disclosed in the present invention.

Fatty acid dimers and the amine salts thereof have been used in hydrocarbon fluid compositions for many years. Their principle function appears to have been as hydrocarbon fluid rust or corrosion inhibitors. Typical background patents showing such use are U.S. Pat. No. 3,696,048, U.S. Pat. No. 2,822,330, U.S. Pat. No. 2,631,979, U.S. Pat. No. 2,632,695, and U.S. Pat. No. 3,017,354. Recently issued U.S. Pat. No. 4,002,437 discloses that the addition to light diesel fuel oils of (1) dimeric and trimeric acids produced by the condensation of unsaturated aliphatic monocarboxylic acids having between about 16 and about 18 carbon atoms per molecule and hydroxyaliphatic monocarboxylic acids having between about 16 and about 18 carbon atoms per molecule in combination with (2) a normally liquid completely or partially neutral amine salt of an oxo-alkyl acid ester of orthophosphoric acid in which each esterifying oxo-alkyl group contains 13 to 16 carbon atoms and the amine is an aliphatic hydrocarbon monoamine of 16 to 24 carbon atoms in which each aliphatic hydrocarbon radical is attached to the nitrogen through a saturated carbon atom, (3) an aliphatic demulsifier consisting of fatty acids alkoxylated by a mixture of ethylene and propylene oxides and (4) a saturated hydrocarbon solvent provides anti-wear properties to the so-called light diesel fuel oils.

SUMMARY OF THE INVENTION

It has now been found that the addition of certain dimerized unsaturated fatty acids to compression ignition fuels adapted for use in diesel engines which comprise (1) from about 70 percent by weight to about 98.45 percent by weight of a monohydroxy alkanol having from 1 to 5 carbon atoms, and (2) from about 1 percent by weight to about 25 percent by weight of a fuel oil boiling above the gasoline boiling range can significantly improve the wear characteristics of said fuels.

DESCRIPTION OF THE PREFERRED EMBODIMENTS

A preferred embodiment of the present invention is an anti-wear compression ignition fuel composition for use in diesel engines comprising (1) from about 70 percent by weight to about 98.45 percent by weight of a monohydroxy alkanol having from 1 to 5 carbon atoms, (2) from about 1 percent by weight to about 25 percent by weight of a fuel oil boiling above the gasoline boiling range, and (3) a wear inhibiting amount of a dimerized unsaturated fatty acid.

A further embodiment of the present invention is a method for inhibiting engine wear in an internal combustion reciprocating diesel engine operating on a compression ignition fuel composition comprising (1) from about 70 percent by weight to about 98.45 percent by weight of a monohydroxy alkanol having from 1 to 5 carbon atoms (2) from about 1 percent by weight to about 25 percent by weight of a fuel oil boiling above the gasoline boiling range, and (3) a wear inhibiting amount of a dimerized unsaturated fatty acid, said method comprising (a) supplying to the fuel induction system of said engine said compression ignition fuel, (b) inducting air into the combustion chambers of said engine (c) compressing said air, (d) injecting said compression ignition fuel into said combustion chambers containing said compressed air, (e) igniting said compressed mixture and (f) exhausting the resultant combustion products resulting in reduced engine wear in said engine.

A still further embodiment of the present invention is a method for preparing a compression ignition fuel composition adapted for use in diesel engines having anti-wear properties which comprises blending (1) from about 70 percent by weight to about 98.45 percent by weight of a monohydroxy alkanol having from 1 to 5 carbon atoms (2) from about 1 percent by weight to about 25 percent by weight of a fuel oil boiling above the gasoline boiling range, and (3) a wear inhibiting amount of a dimerized unsaturated fatty acid.

The fuel for use in accordance with the present invention may be any fuel oil, such as gas oil, distillate oil or furnace oil, but is preferably an oil which boils in the kerosene and gas oil range. In general, such fuel oil fractions have an initial boiling point of about 400° F. and an end boiling point of about 700° F.

Monohydroxy alcohols which can be used in the present invention include those containing from 1 to 5 carbon atoms. Preferred alcohols are saturated aliphatic monohydric alcohols having from 1 to 5 carbon atoms. Methanol, ethanol, propanol, n-butanol, isobutanol, amyl alcohol and isoamyl alcohol are preferred alcohols for use in the present invention. Of these, ethanol is the most preferred.

The dimerized unsaturated fatty acid component of the fuel composition of the present invention is preferably a dimer of a comparatively long chain fatty acid, e.g. containing from 8 to 30 carbon atoms, and may be pure, or substantially pure, dimer. Alternatively, and preferably, the material sold commercially and known as "dimer acid" may be used. This latter material is prepared by dimerizing unsaturated fatty acid and consists of a mixture of monomer, dimer and trimer of the acid. A particularly preferred dimer acid is the dimer of linoleic acid.

Other additives may be used in formulating the compression ignition fuel compositions of the present invention. These may include conventional ignition accelerators such as organic nitrates, preferably substituted or unsubstituted alkyl or cycloalkyl nitrates having up to about 10 carbon atoms, preferably from 2 to 10 carbon atoms. The alkyl group may be either linear or branched. Specific examples of nitrate compounds suitable for use in the present invention include, but are not limited to the following:

methyl nitrate
ethyl nitrate n-propyl nitrate
isopropyl nitrate
allyl nitrate
n-butyl nitrate
isobutyl nitrate
sec-butyl nitrate
tert-butyl nitrate
n-amyl nitrate
isoamyl nitrate
2-amyl nitrate
3-amyl nitrate
tert-amyl nitrate
n-hexyl nitrate
2-ethylhexyl nitrate
n-heptyl nitrate
sec-heptyl nitrate
n-octyl nitrate
sec-octyl nitrate
n-nonyl nitrate
n-decyl nitrate
n-dodecyl nitrate
cyclopentylnitrate
cyclohexylnitrate
methylcyclohexyl nitrate
isopropylcyclohexyl nitrate and the esters of alkoxy substituted aliphatic alcohols, such as 1-methoxypropyl-2-nitrate, 1-ethoxypropyl-2-nitrate, 1-isopropoxy-butyl nitrate, 1-ethoxybutyl nitrate and the like. Preferred alkyl nitrates are ethyl nitrate, propyl nitrate, amyl nitrates and hexyl nitrates. Other preferred alkyl nitrates are mixtures of primary amyl nitrates or primary hexyl nitrates. By primary is meant that the nitrate functional group is attached to a carbon atom which is attached to two hydrogen atoms. Examples of primary hexyl nitrates would be n-hexyl nitrate, 2-ethylhexyl nitrate, 4-methyl-n-pentyl nitrate and the like. Preparation of the nitrate esters may be accomplished by any of the commonly used methods; such as, for example, esterification of the appropriate alcohol, or reaction of a suitable alkyl halide with silver nitrate.

Other conventional ignition accelerators may also be used in the present invention, such as hydrogen peroxide, benzoyl peroxide, etc. Further certain inorganic and organic chlorides and bromides, such as, for example, aluminum chloride, ethyl chloride or bromide may find use in the present invention as primers when used in combination with the alkyl nitrate accelerators of the present invention.

The amount of dimerized unsaturated fatty acid used in the compression ignition fuel compositions of the present invention should be enough to provide the desired wear protection. This concentration is conveniently expressed in terms of weight percent of dimerized unsaturated fatty acid based on the total weight of the compression ignition fuel composition. A preferred range is from about 0.05 to about 2.0 weight percent dimerized unsaturated fatty acid. A most preferred range is from about 0.05 to about 1.0 weight percent dimerized unsaturated fatty acid.

The amount of alkyl nitrate or nitrite ignition accelerator used in the fuel compositions of the present invention is from about 0.5 weight percent to about 5.0 weight percent based on the total weight of the compression ignition fuel composition. Preferred amounts are between 1.0 weight percent and 3.0 weight percent.

Other additives may be used in formulating the compression ignition fuel compositions of the present inventions. These compounds include demulsifying agents, corrosion inhibitors, antioxidants, dyes, and the like, provided they do not adversely effect the anti-wear effectiveness of the dimerized unsaturated fatty acid additives.

Conventional blending equipment and techniques may be used in preparing the fuel compositions of the present invention. In general, a homogeneous blend of the foregoing active components is achieved by merely blending the dimerized unsaturated fatty acid component of the present invention with the monohydroxy alkanol, diesel fuel, and optionally the ignition accelerator components of the present invention in a determined proportion sufficient to reduce the wear tendencies of the fuel. This is normally carried out at ambient temperature. The following examples illustrate the preparation of some typical fuel compositions of the present invention.

EXAMPLE I

To a blending vessel is added 950 parts of 200 proof ethanol, 10 parts No. 2 diesel fuel, 30 parts n-propyl nitrate and 10 parts of a blend of 40 weight percent of the dimer acid derived from linoleic acid and 60 weight percent kerosene. The mixture is stirred at room temperature until homogenous forming a fuel composition useful for reducing and/or inhibiting the amount of engine wear in internal combustion reciprocating diesel engines operating on said fuel composition.

EXAMPLE II

To a blending vessel is added 900 parts of 200 proof ethanol, 70 parts No. 2 diesel fuel, 20 parts n-propyl nitrate and 10 parts of a blend of 40 weight percent of the dimer acid derived from linoleic acid and 60 weight percent kerosene. The mixture is stirred at room temperature until homogenous forming a fuel composition useful for reducing and/or inhibiting the amount of engine wear in internal combustion reciprocating diesel engines operating on said fuel composition.

The amounts of each ingredient in the foregoing compositions can be varied within the limits aforediscussed to provide the optimum degree of each property.

The lubricity or wear properties of the fuel compositions were determined in the 4-Ball Wear Test. This test is conducted in a device comprising four steel balls, three of which are in contact with each other in one plane in a fixed triangular position in a reservoir containing the test sample. The fourth ball is above and in contact with the other three. In conducting the test, the upper ball is rotated while it is pressed against the other three balls while pressure is applied by weight and lever arms. The diameter of the scar on the three lower balls are measured by means of a low power microscope, and the average diameter measured in two directions on each of the three lower balls is taken as a measure of the anti-wear characteristics of the fuel. A larger scar diameter means more wear. The balls were immersed in base fuel containing the test additives. Applied load was 5 kg and rotation was at 1,800 rpm for 30 minutes at ambient temperature. Tests were conducted both with base fuel* alone and base fuel containing the test additives. Results are as follows:

| Additive[1] Conc (wt. %) | Scar Diameter (mm) |
|---|---|
| None | 0.51 |
| 1.0 | 0.38 |

[1] 40 wt. % dimer of linoleic acid + 60 wt. % kerosene

*Base fuel was a blend of 85.5 weight percent 200 proof ethanol, 9.5 weight percent No. 2 diesel fuel, and 5.0 weight percent n-propyl nitrate.

The test fuel without any additive gave a scar diameter of 0.51 mm. A mixture of 40 weight percent dimer acid of linoleic acid and 60 weight percent kerosene at a concentration of 1.0 weight percent significantly reduced the wear index to 0.38 mm.

I claim:

1. As a new composition of matter, an anti-wear compression ignition fuel composition for use in diesel engines comprising (1) from about 70 percent by weight to about 98.45 percent by weight of a monohydroxy alkanol having from 1 to 5 carbon atoms, (2) from about 1 percent by weight to about 25 percent by weight of a fuel oil boiling above the gasoline boiling range, and (3) a wear inhibiting amount of a dimerized unsaturated fatty acid.

2. The composition of claim 1 wherein said monohydroxy alkanol is ethanol.

3. The composition of claim 1 wherein said dimerized unsaturated fatty acid is the dimer acid derived from linoleic acid.

4. The composition of claim 1 containing as an ignition accelerator a substituted or unsubstituted alkyl or cycloalkyl nitrate having up to about 10 carbon atoms.

5. The composition of claim 4 wherein said ignition accelerator is selected from methyl nitrate, ethyl nitrate, propyl nitrate, amyl nitrates, hexyl nitrates or a mixture of primary amyl nitrates and primary hexyl nitrates.

6. The composition of claim 5 wherein said ignition accelerator is ethyl nitrate.

7. The composition of claim 5 wherein said monohydroxy alkanol is ethanol.

8. The composition of claim 7 wherein said dimerized unsaturated fatty acid is the dimer derived from linoleic acid.

9. The composition of claim 8 containing from about 0.05 weight percent to about 2.0 weight percent dimer acid derived from linoleic acid and from about 0.5 weight percent to about 5.0 weight percent ignition accelerator based on the total weight of the said composition.

10. A method for inhibiting engine wear in an internal combustion reciprocating diesel engine operating on a compression ignition fuel comprising (1) from about 70 percent by weight to about 98.45 percent by weight of a monohydroxy alkanol having from 1 to 5 carbon atoms (2) from about 1 percent by weight to about 25 percent by weight of a fuel oil boiling above the gasoline boiling range, and (3) a wear inhibiting amount of a dimerized unsaturated fatty acid, said method comprising (a) supplying to the fuel induction system of said engine said compression ignition fuel, (b) inducting air into the combustion chambers of said engine (c) compressing said air, (d) injecting said compression ignition fuel into said combustion chambers containing said compressed air, (e) igniting said compressed mixture, and (f) exhausting the resultant combustion products resulting in reduced engine wear in said engine.

11. The method of claim 10 wherein said monohydroxy alkanol is ethanol.

12. The method of claim 10 wherein said dimerized unsaturated fatty acid is the dimer acid derived from linoleic acid.

13. The method of claim 10 wherein said fuel composition contains as an ignition accelerator a substituted or unsubstituted alkyl or cycloalkyl nitrate having up to about 10 carbon atoms.

14. The method of claim 13 wherein said ignition accelerator is selected from methyl nitrate, ethyl nitrate, propyl nitrate, amyl nitrates, hexyl nitrates or a mixture of primary amyl nitrate and primary hexyl nitrates.

15. The method of claim 14 wherein said ignition accelerator is ethyl nitrate.

16. The method of claim 14 wherein said monohydroxy alkanol is ethanol.

17. The method of claim 16 wherein said dimerized unsaturated fatty acid is the dimer acid derived from linoleic acid.

18. The method of claim 17 wherein said ignition accelerator is present in an amount of from about 0.5 weight percent to about 5.0 weight percent and said dimer acid derived from linoleic acid is present in an amount from about 0.05 to about 2.0 weight percent based on the total weight of said composition.

19. A method for preparing a compression ignition fuel adapted for use in diesel engines having anti-wear properties which comprises blending (1) a wear inhibiting amount of a dimerized unsaturated fatty acid, with (2) from about 70 percent by weight to about 98.45 percent by weight of a monohydroxy alkanol having from 1 to 5 carbon atoms, and (3) from about 1 percent by weight to about 25 percent by weight of a fuel oil boiling above the gasoline boiling range.

20. The method of claim 19 wherein said monohydroxy alkanol is ethanol.

21. The method of claim 19 wherein said dimerized unsaturated fatty acid is the dimer acid derived from linoleic acid.

22. The method of claim 19 wherein an ignition accelerator comprising a substituted or unsubstituted alkyl and cycloalkyl nitrate having up to about 10 carbon atoms is blended with said compression ignition fuel.

23. The method of claim 22 wherein said ignition accelerator is selected from methyl nitrate, ethyl nitrate, propyl nitrate, amyl nitrates, hexyl nitrates or a mixture of primary amyl nitrates and primary hexyl nitrates.

24. The method of claim 23 wherein said ignition accelerator is ethyl nitrate.

25. The method of claim 23 wherein said monohydroxy alkanol is ethanol.

26. The method of claim 25 wherein said dimerized unsaturated fatty acid is the dimer derived from linoleic acid.

27. The method of claim 26 wherein said ignition accelerator is present in an amount of from about 0.5 weight percent and said dimer acid derived from linoleic acid is present in an amount of from about 0.05 weight percent to about 2.0 weight percent based on the total weight of said composition.

* * * * *